(12) United States Patent
Bahalul et al.

(10) Patent No.: US 10,718,444 B2
(45) Date of Patent: Jul. 21, 2020

(54) LIQUID DISCHARGE VALVE

(71) Applicant: A.R.I. FLOW CONTROL ACCESSORIES LTD., Kibbutz Kfar Charuv (IL)

(72) Inventors: Yoel Bahalul, Moshava Kineret (IL); Mordechai Kandanyan, Kibbutz Kfar Charuv (IL)

(73) Assignee: A.R.I. FLOW CONTROL ACCESSORIES LTD., Kibbutz Kfar Charuv (IL)

( * ) Notice: Subject to any disclaimer, the term of this patent is extended or adjusted under 35 U.S.C. 154(b) by 0 days.

(21) Appl. No.: 14/913,409

(22) PCT Filed: Aug. 27, 2014

(86) PCT No.: PCT/IL2014/050774
§ 371 (c)(1),
(2) Date: Feb. 22, 2016

(87) PCT Pub. No.: WO2015/029036
PCT Pub. Date: Mar. 5, 2015

(65) Prior Publication Data
US 2016/0201818 A1 Jul. 14, 2016

Related U.S. Application Data

(60) Provisional application No. 61/870,309, filed on Aug. 27, 2013.

(51) Int. Cl.
*F16K 24/04* (2006.01)
*F16K 31/385* (2006.01)
*F16K 15/02* (2006.01)

(52) U.S. Cl.
CPC .......... *F16K 24/042* (2013.01); *F16K 15/023* (2013.01); *F16K 31/385* (2013.01)

(58) Field of Classification Search
CPC ..... F16K 24/042; F16K 31/385; F16K 15/023
See application file for complete search history.

(56) References Cited

U.S. PATENT DOCUMENTS 3,055,629 A * 9/1962 Jurs .......................... F16K 24/04
251/175
3,100,502 A * 8/1963 Ford ......................... F16K 17/08
137/469

(Continued)

FOREIGN PATENT DOCUMENTS

CN 1281542 A 1/2001
DE 10338330 3/2015

(Continued)

OTHER PUBLICATIONS

International Search Report and Written Opinion issued in a corresponding application PCT/IL2014/050774 dated Jan. 1, 2015.

*Primary Examiner* — Kevin F Murphy
*Assistant Examiner* — Patrick C Williams
(74) *Attorney, Agent, or Firm* — Insigne LLP

(57) ABSTRACT

Provided is a liquid discharge valve including a housing configured with an inlet port coupleable to a liquid line, a liquid outlet port, an inlet chamber accommodating a pressure responsive closing mechanism disposed between said inlet port and said liquid outlet port and configured for selectively opening a liquid flow path therebetween, a control chamber being in flow communication with the inlet chamber via a restricted fluid passage, a gas operated valve being in flow communication with the control chamber, and a discharge pilot valve being in flow communication with the control chamber.

15 Claims, 8 Drawing Sheets

(56) References Cited

U.S. PATENT DOCUMENTS

| | | | |
|---|---|---|---|
| 3,605,802 A | * | 9/1971 | Hertell .................. F16K 15/063 |
| | | | 137/514.3 |
| 3,712,578 A | | 1/1973 | Dawson |
| 4,770,201 A | | 9/1988 | Zakai |
| 5,771,924 A | * | 6/1998 | Huygen .............. F16K 17/0453 |
| | | | 137/522 |
| 5,915,665 A | | 6/1999 | Paese et al. |
| 6,105,608 A | | 8/2000 | Katzman |
| 8,100,143 B2 | | 1/2012 | Wan et al. |
| 9,383,034 B2 | * | 7/2016 | Chen ....................... F16K 47/02 |

FOREIGN PATENT DOCUMENTS

| | | |
|---|---|---|
| EA | 200900379 A1 | 2/2010 |
| GB | 870882 A | 6/1961 |
| RU | 2374542 C2 | 11/2009 |
| RU | 2439412 C1 | 1/2012 |

\* cited by examiner

LIQUID DISCHARGE VALVE

CROSS-REFERENCE TO RELATED APPLICATIONS

The present application is a U.S. National Phase of PCT/IL2014/050774 filed on Aug. 27, 2014 claiming priority to U.S. provisional application No. 61/870,309 filed Aug. 27, 2013; the disclosure of the PCT Application is hereby incorporated by reference into the present Application.

TECHNOLOGICAL FIELD

The presently disclosed subject matter is concerned with a liquid discharge valve, configured for high flow and discharging of liquid at high pressure.

BACKGROUND ART

References considered to be relevant as background to the presently disclosed subject matter are listed below:
  U.S. Pat. No. 4,770,201
  U.S. Pat. No. 6,105,608
Acknowledgement of the above references herein is not to be inferred as meaning that these are in any way relevant to the patentability of the presently disclosed subject matter.

BACKGROUND

U.S. Pat. No. 4,770,201 discloses an air purge valve comprising a housing, a fluid inlet for said housing, first and second outlet apertures formed in said housing respectively bounded by first and second valve seatings, said first aperture being of substantially elongated slit like shape, communicating at one end thereof with the second outlet aperture and being substantially less in area than the second aperture; a flexible closure membrane secured at one end to said housing and adapted to be biased, under fluid pressure in said housing, against said valve seatings so as to seal said outlet apertures; a float member located in said housing so as to be floatingly displaceable therein between first and second positions respectively adjacent said fluid inlet and said outlet apertures and means for coupling said float member to an opposite end of said membrane; the arrangement being such that displacement of said float member from said second to first position progressively detaches successive linear transverse portions of said membrane initially from said first valve seating so as to open initially said first outlet aperture and subsequently from said second valve seating so as to open subsequently said second outlet aperture whilst displacement of said float member from said first to said second position allows for said membrane to become sealingly biased against said seatings.

U.S. Pat. No. 6,105,608 discloses a gas purge valve comprising a valve housing that has a valve inlet and major and minor valve outlets, a valve partition mounted in the housing divides the housing into a first chamber communicating with the valve inlet and a second chamber that communicates with the minor valve outlet. A restrictive flow passage is defined in the housing that effects communication between the first and second chambers and has a through flow rate less than that of the minor valve outlet. A minor valve closure device is provided for closing the minor valve outlet to liquid outflow. A differential pressure responsive device mounted in the partition member and displaceable in response to a pressure differential between the chambers and a major valve outlet obturating device responsive to displacement of the differential pressure responsive device into the opening of the major valve outlet when the pressure differential exceeds a predetermined magnitude.

GENERAL DESCRIPTION

According to the disclosed subject matter there is liquid discharge valve configured for discharge of substantially a large volume of liquid and associated with a pilot valve for manipulating the liquid discharge valve into its open, liquid discharging position.

There is disclosed a liquid discharge valve comprising a housing configured with an inlet port coupleable to a liquid line, a liquid outlet port, an inlet chamber accommodating a pressure responsive closing mechanism disposed between said inlet port and said liquid outlet port and configured for selectively opening a liquid flow path therebetween, a control chamber being in flow communication with the inlet chamber via a restricted fluid passage, a gas operated valve being in flow communication with the control chamber, and a discharge pilot valve being in flow communication with the control chamber.

According to a particular configuration of the present described subject matter there is disclosed a liquid discharge valve comprising a housing configured with an inlet port coupleable to a liquid line, a liquid outlet port, a pressure operated closing mechanism disposed between said inlet port and said liquid outlet port and configured for selectively opening a liquid flow path between said inlet port and said liquid outlet port, said sealing mechanism dividing the housing into an inlet chamber and a control chamber disposed after the closing mechanism; a gas operated valve being in flow communication with the control chamber, and a pilot valve being in flow communication with the control chamber; the sealing mechanism comprises an open flow restricted fluid passage between the inlet chamber and the control chamber.

The arrangement being such that at a closed position of the sealing mechanism the pressure at the inlet chamber ($P_{in}$) is equal to the pressure at the control chamber ($P_{ctrl}$).

According to one particular configuration of the disclosed subject matter, there is a liquid discharge valve comprising a housing configured with an inlet port coupleable to a liquid line and a liquid outlet port, a pressure responsive sealing mechanism disposed between an inlet chamber associated with the inlet port, and a control chamber of the housing and configured for selectively opening a fluid flow path between said inlet chamber and the liquid outlet port, a gas operated valve being in flow communication with the control chamber and comprising a fluid outlet port, and a pilot valve associated with the control chamber.

The pilot valve has an inlet port being in flow communication with the control chamber and a discharge port, with a governed flow path extending therebetween, said governed flow path being configured with a controller manipulable between an open position and a normally closed position wherein said governed flow path is sealed.

The arrangement is such that the closing mechanism is normally disposed at its closed position, preventing liquid flow from the inlet port to the liquid outlet port, and the gas operated valve is at its closed position, thus preventing liquid flow through a fluid outlet port therereof. At the event of pressure decrease within the control chamber owing to pressure discharge by the pilot valve the closing mechanism displaced into its open position so as to facilitate liquid flow along the flow path between the inlet port and the liquid outlet port.

Furthermore, at the event of sudden termination of buoyant force within the control chamber the gas operated valve will open to facilitate airing of the liquid line.

The arrangement is further such that pressure differential does not buildup over the closing mechanism and therefore the restricted fluid passage has a cross-section area smaller than that of the inlet port of the pilot valve.

The restricted fluid passage can be an opening extending through the sealing mechanism.

Alternatively, there can be configured a bypass line or bypass port extending between the inlet chamber and the control chamber.

According to one particular configuration, the gas operated valve is a gas purge valve, e.g. of the type comprising a housing configured with an inlet port being in flow communication with the control chamber, and a fluid outlet port, and a float member displaceable between a normally closed position prohibiting fluid flow through the fluid outlet port, under liquid buoyant pressure, and an open position.

The gas operated valve, according to one particular example comprises a housing, a fluid inlet for said housing, first and second outlet apertures formed in said housing respectively bounded by first and second valve seatings, said first aperture being of substantially elongated slit like shape, communicating at one end thereof with the second outlet aperture and being substantially less in area than the second aperture; a flexible closure membrane secured at one end to said housing and adapted to be biased, under fluid pressure in said housing, against said valve seatings so as to seal said outlet apertures; a float member located in said housing so as to be floatingly displaceable therein between first and second positions respectively adjacent said fluid inlet and said outlet apertures and means for coupling said float member to an opposite end of said membrane; the arrangement being such that displacement of said float member from said second to first position progressively detaches successive linear transverse portions of said membrane initially from said first valve seating so as to open initially said first outlet aperture and subsequently from said second valve seating so as to open subsequently said second outlet aperture whilst displacement of said float member from said first to said second position allows for said membrane to become sealingly biased against said seatings.

It is however appreciated that rather than said first and second outlet apertures and respective first and second valve seatings, there may be one outlet and respectively one seating.

Any one or more of the following features, designs and configurations can be incorporated in a liquid discharge valve according to the present disclosure, separately or in any combinations thereof:

- The closing mechanism comprises a sealing piston axially displaceable between an open position (wherein the fluid flow path is open) and a closed position;
- The closing mechanism is normally disposed at a closed position thereof;
- The sealing mechanism comprises a sealing membrane preventing liquid flow between the inlet chamber and the sealing chamber;
- The sealing mechanism comprises a piston unit axially displaceable within the housing between an open position, facilitating liquid flow through said fluid flow path, and a closed position;
- The pilot valve is controllable so as to govern the pressure required to open it. Such governing can take place by controlling a closure pressure applied on a sealing membrane thereof;
- The pilot valve can be configured for manual manipulation between a normally closed position, and an open position;
- The pilot valve can be configured for opening at determined time intervals or at timed schedules;
- The pilot valve can be configured for opening upon buildup of a predetermined pressure differential between ambient pressure ($P_{atm}$) and the pressure at the control chamber ($P_{ctrl}$);
- The pilot valve can be configured for opening at predetermined temperatures (e.g. upon pressure drop to liquid frizzing point);
- The pilot valve can be configured for closing/opening by remote control (e.g. telecommunication, radio communication, etc.,);
- The pilot valve can be configured for closing/opening upon sensing (at any location along the line) of chemical changes, over predetermined values, e.g. change of level of fluoride, level of chloride, level of toxic or biological material, etc.;
- The pilot valve can be configured for slow and dampened displacement into its closed position, so as to prevent generation of shock waves through a liquid system accommodating the liquid discharge valve according to the disclosure;
- According to a particular example the pilot valve is configured for discharging at a pressure threshold of about 6-10 bar;
- The pilot valve can be configured with an additional port extending at a control chamber thereof;
- Said additional port can, for example, be fitted with a needle-type valve for controlling pressure and eliminating or substantially reducing hammering during displacement of a sealing diaphragm thereof;
- The additional port can be configured for receiving therein a sensing member, or a controller or a dripper, etc.;
- A liquid drainage port extends between the control chamber and the inlet chamber, said liquid drainage port configured to facilitate liquid draining from the control chamber;
- The gas operated valve can be integrally formed with the housing of the liquid discharge valve, or be articulated therewith;
- The gas operated valve is configured with a one way valve facilitating fluid flow only in direction to expel gas from the second chamber, i.e. to prevent gas flow into the control chamber through a gas outlet of the gas operated valve;
- Displacement of the gas operated valve into the closed position occurs when pressure At the control chamber is greater than the ambient (atmospheric) pressure: $P_{in} > P_{atm}$;
- The pressure required for displacing the gas operated valve into its closed position is determined by the buoyant force and a pressure differential, wherein:

$$P_{in} - P_{atm} \geq \gamma * P_{ctrl}$$

Where γ is a predetermined coefficient controllable by the pilot valve;

According to a particular example $\gamma \approx 0.2$ bar;

Once the gas operated valve displaces into its closed position, pressure at the inlet chamber ($P_{in}$) equals to the pressure at the control chamber ($P_{ctrl}$);

The restricted fluid passage has a cross-section area smaller than that of the. According to a particular example the diameter of the inlet port of the pilot valve ($D_{ipv}$) is greater than the diameter of the restricted fluid passage ($D_{rfp}$);

According to one particular example $D_{ipv}/D_{rfp} \cong 1.5$;

When it is required to air the liquid line and allow gas inlet through the liquid outlet port (e.g. upon sudden pressure drop within the supply line), the control chamber should be maintained at under-pressure in order to facilitate displacement of the sealing mechanism into the open position;

The restricted fluid passage is an opening extending through the closing mechanism and can comprise a tubular segment extending therefrom into the inlet port. The arrangement being such that at the event of airing the liquid line and allow gas inlet through the liquid outlet port a venturi effect takes place about said tubular segment, resulting in pressure differential causing a suction effect and under-pressure at the control chamber;

According to a particular example of the present disclosure, at least the gas operated valve is integrally formed or integrated with the housing of the liquid discharge valve, and according to yet an example, also the pilot valve is integrally formed or integrated with the housing of the liquid discharge valve.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
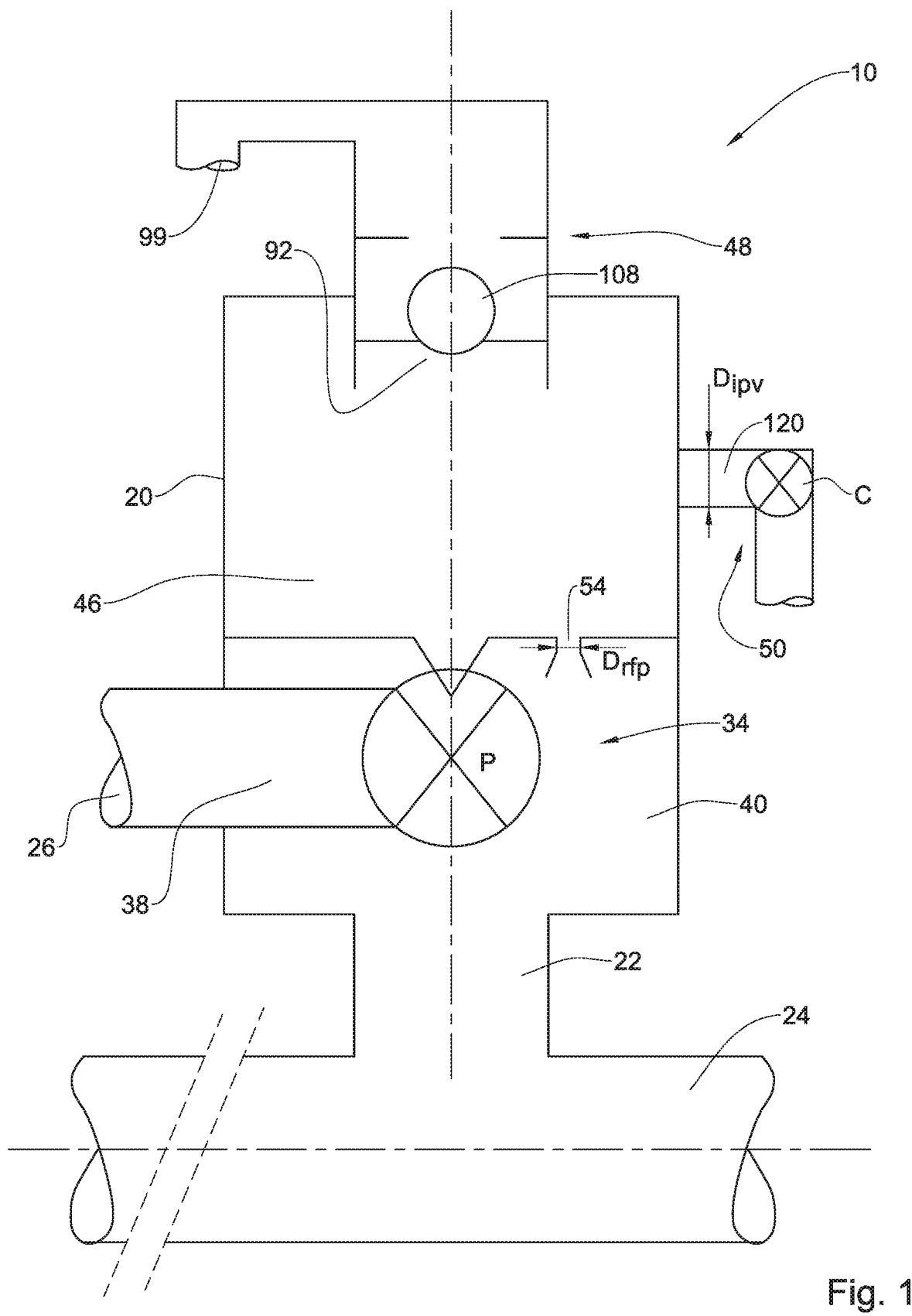
FIG. 1 is a schematic diagram of a liquid discharge valve according to the present disclosure.

Attention is first directed to FIG. 1 of the drawings schematically illustrating a liquid discharge valve according to the disclosure and generally designated 10, said liquid discharge valve comprising a housing 20 configured with an inlet port 22 coupleable to a liquid line 24, a liquid outlet port 26, a pressure responsive closing mechanism generally designated 34 is disposed between said inlet port 22 and said liquid outlet port 26 and configured for selectively opening a liquid flow path 38 between said inlet port 22 and said liquid outlet port 26. The closing mechanism 34 divides the housing 20 into an inlet chamber 40 and a control chamber 46 disposed after the closing mechanism 34. A gas operated valve generally designated 48 is fitted to the housing and is in flow communication with the control chamber 46. A discharge pilot valve generally designated 50 is also in flow communication with the control chamber 46 and a restricted fluid passage 54 extends between the inlet chamber 40 and the control chamber 46.

Figure 2A:
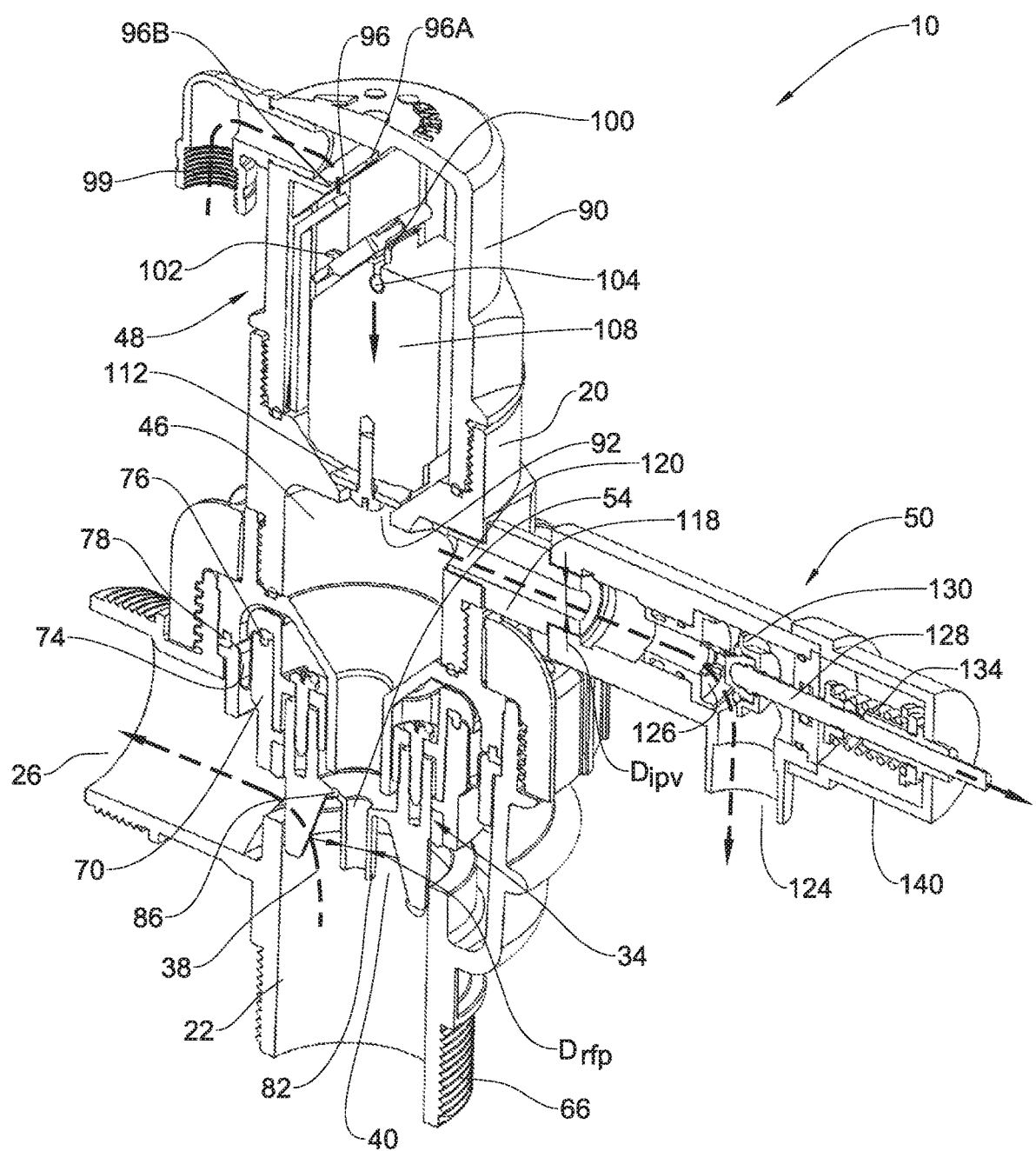
FIGS. 2A and 2B are top right and top left perspective views, respectively, of a liquid discharge valve according to an example of the disclosure, at a closed position thereof.
Figure 2B:
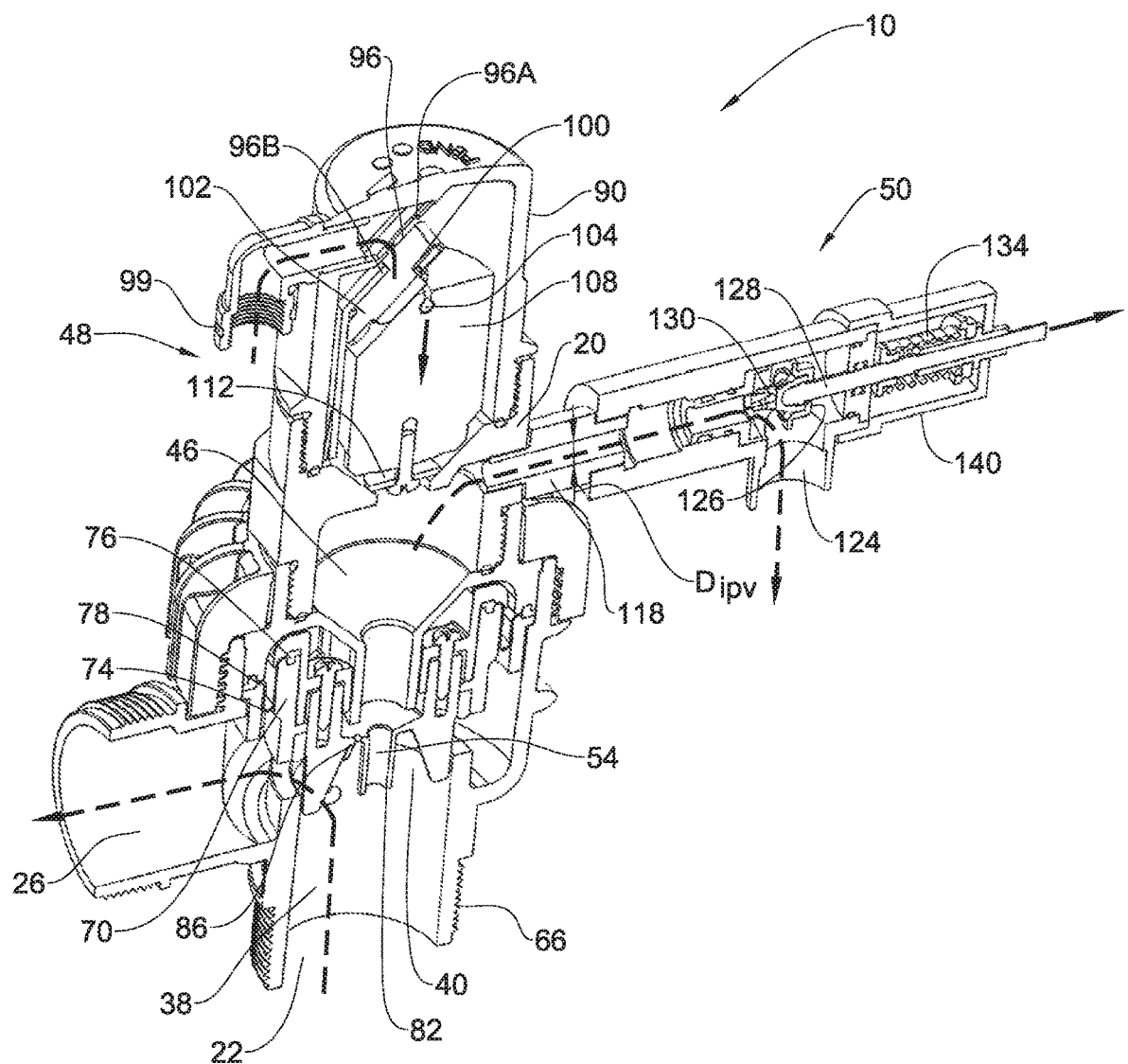

With further detail being made now also to FIGS. 2 and 3, the valve 10 is made for example of plastic molded material and the inlet port 22 is coupled to the liquid line 24 for example by a screw coupling at 66 or any other suitable mechanism such as a flanged portion (not shown), a coupler (not shown), etc.

The liquid outlet port 26 extends from the housing and can be coupled for returning any liquids flushed therethrough to the liquid system, or for disposing elsewhere.

Figure 3A:
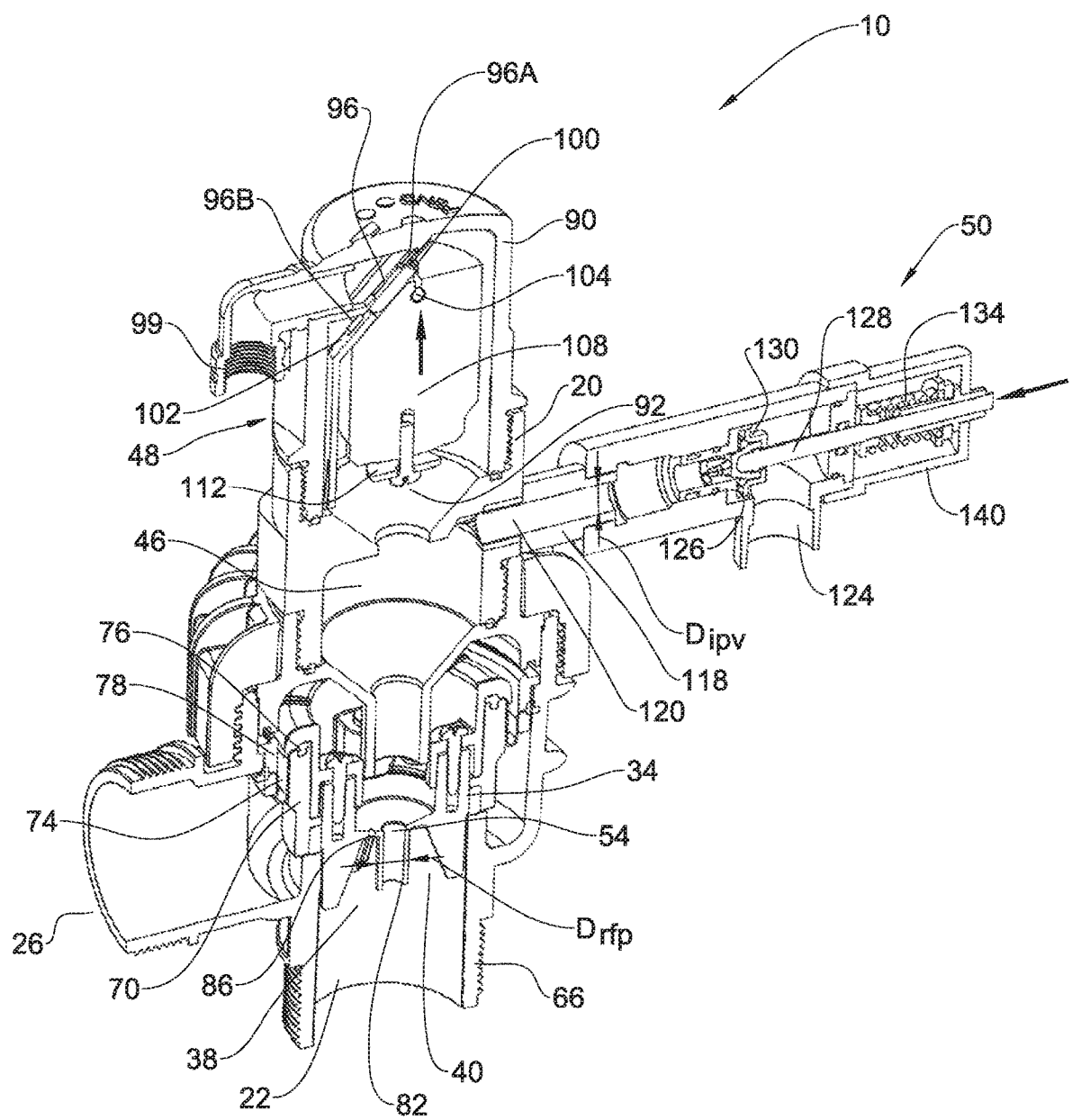
FIGS. 3A and 3B are top right and top left perspective views, respectively, of the liquid discharge valve of FIGS. 2A and 2B, at an open position thereof.
Figure 3B:
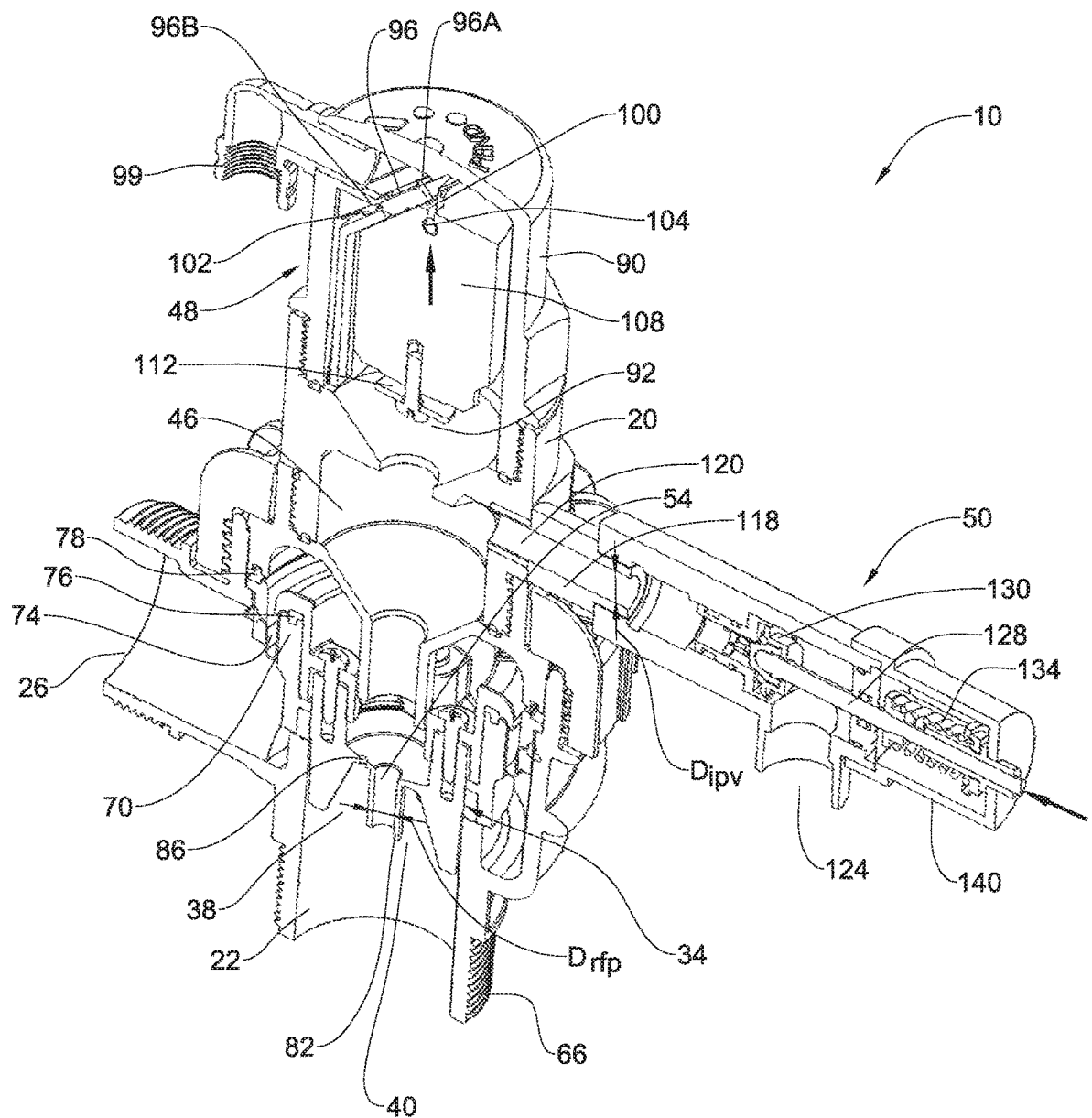

Disposed within the housing 20 there is provided a pressure responsive closing mechanism 34 comprising a plunger assembly 70 configured for axial displacement within the housing between an uppermost, open position (FIGS. 2A and 2B), and a lowermost, closed position (FIGS. 3A and 3B). In the present example the plunger assembly 70 is composed of several components and it is however appreciated that other configurations are possible too, mutatis mutandis. A rolling membrane 74 is clamped at one end thereof 76 to the plunger assembly 70 and at another end thereof 78 it is clamped to a portion fixed within inside walls of the housing. The membrane 74 is pliable and serves as a flexible sealing member albeit displacement of the plunger assembly 70. The membrane divides the housing into the inlet chamber 40 and the ontrol chamber 46.

The always open restricted fluid passage 54 extends through the plunger assembly 70 of the closing mechanism 34 whereby a tubular segment 82 extends therefrom downwards into the inlet port 22. The arrangement being such that at the event of airing the liquid line and allow gas inlet through the liquid outlet port a venturi effect takes place about said tubular segment 82, resulting in pressure differential causing a suction effect and under-pressure at the control chamber.

A liquid drainage port 86 extends between the control chamber 46 and the inlet chamber 40, said liquid drainage port 86 being configured to facilitate liquid draining from the control chamber 46 back to the liquid line 24.

The arrangement is such that the effective surface area acting at the control chamber side of the closing mechanism is similar to the surface area acting at the inlet chamber side thereof.

The gas operated valve 48 is mounted at a top portion of the housing 20. In the particular example illustrated in FIGS. 2 and 3 of the drawings, the valve 48 is a gas purge valve of the type disclosed in U.S. Pat. No. 4,770,201, incorporated herein by reference. This however is a particular example and other configurations of discharge valves can be employed for this purpose.

The gas operated valve 48 comprises a housing 90 fixedly coupled to the housing 20, a fluid inlet 92 extending into and being in flow communication with the control chamber 46.

The housing 90 is configured with a fluid through-flow aperture 96 communicating with an outlet 99 and a valve seating 98 formed in said housing 90 and bounding said aperture 96. A flexible closure membrane 100 is secured at one end 102 to said housing 90 and at a second end 104 to a float member 108 disposed within the housing 90 and being axially displaceable between a lowermost, open position (FIGS. 2A and 2B), and an uppermost, closed position (FIGS. 3A and 3B), under buoyant pressure. At the closed position the closure membrane 100 is adapted to be biased, as will be explained hereinafter, against said valve seating 98 so as to seal said aperture 96.

In the particular example the through-flow aperture 96 is configured with a first outlet aperture 96A being of substantially elongated slit like shape, and communicating at one end thereof with a second outlet aperture 96B and being substantially greater in area than the first aperture 96A.

The float member 108 is floatingly displaceable within the housing 90 between first and second positions respectively adjacent said fluid inlet and said outlet apertures and means for coupling said float member to an opposite end of said membrane;

The arrangement being such that displacement of the float member 108 from said closed position (FIG. 3) to the open position (FIG. 2) progressively detaches successive linear transverse portions of the closure membrane 100, initially from the first outlet aperture 96A and subsequently from the second outlet aperture 96B, whilst displacement of said float member 108 from open position to the closed position, allows for the closure membrane 100 to become sealingly biased against the outlet apertures and sealing of the valve seating 98.

At a bottom end of the float member 108 there is articulated a one way valve 112 in the form of a sealing disc configured for bearing against sealing shoulders of the fluid inlet 92 for sealing thereof and thus preventing fluid ingress into the control chamber 46 when the gas operated valve 48 is at its open position (FIG. 2).

As can further be seen, the discharge pilot valve generally designated 50 is articulated to the housing 20 with an inlet port 118 and an inlet fluid flow path 120 extending into the control chamber 46. It is appreciated that the section area of the inlet fluid flow path 120 is greater than that of the restricted fluid passage 54. According to a particular example the ratio of diameter of the inlet port of the pilot valve ($D_{ipv}$) and the diametr of the restricted fluid passage ($D_{rfp}$) is approximately $(D_{ipv})/(D_{rfp}) \cong 1.5$.

The discharge pilot valve 50 is configured with a discharge port 124 and a sealing shoulder 126 disposed between the inlet port 118 and the discharge port 124. A sealing plunger 128 is configured at one end thereof with a sealing member 130 configured for bearing against the annular sealing shoulder 126 in a sealing fashion, with an opposite end of the plunger 128 being biased by a compression spring 134. The plunger is thus displaceable between a normally closed position (FIGS. 3A and 3B) wherein the sealing member 130 sealingly bears against the sealing shoulder 126, and an open position (FIGS. 2A and 2B) wherein the sealing member 130 is disengaged from the sealing shoulder 126, so as to relief pressure from the control chamber 46.

In the particular example the discharge pilot valve 50 is a pressure relief valve configured for opening at a predetermined pressure threshold. This pressure threshold is controllable through manual governing the compression force of the coiled spring 134 by rotating the cap 140, thereby tensioning or releasing the spring.

According to other examples the discharge pilot valve 50 can be any one or more of a variety of configurations such as a manually openable valve (i.e. the pilot valve is openable only or also manually), or by remote communication, or the pilot valve can be articulated with a controller for opening the pilot valve according to any one or more signals such as predetermined time intervals or timed schedules, ambient or liquid temperature, pressure differential between ambient pressure ($P_{atm}$) and the pressure at the control chamber ($P_{ctrl}$), etc.

The arrangement and operation of the valve liquid discharge valve 10 disclosed herein is such that at the normal state the valve is at its closed position as disclosed in FIGS. 3A and 3B, wherein the liquid flow path 38 between said inlet port 22 and said liquid outlet port 26 is closed, the gas operated valve 48 is closed and the discharge pilot valve 50 is closed too. At this position the pressure at the inlet chamber 40 is substantially similar to the pressure at the control chamber 46 owing to the restricted fluid passage 54 extending between these chambers, whereby the surface area difference about faces of the membrane 74 it is biased into the closed position and likewise, liquid within the control chamber 46 entails displacement of the float member 108 of the gas operated valve 48 into the closed position.

Once the discharge pilot valve 50 is displaced into the open position (FIGS. 2A and 2B) owing to a control signal or pressure differential, etc., the flow path between the inlet port 118 and the discharge port 124 opens, resulting in liquid discharge from the control chamber 46 and respective pressure drop therein. As a result of the pressure drop at the control chamber the pressure equilibrium over the membrane 74 and the closing mechanism 34 is disturbed, entailing displacement of the closing mechanism 34 into its open position (FIGS. 2A and 2B), opening the flow path 38 so that liquid can flow from the liquid line 24. Once the flow path 38 is opened it facilitates liquid discharge at high flow rate.

Also as a result of pressure drop at the control chamber 46, the float 108 of the gas operated valve 48 displaces into the open position, facilitating fluid intake therethrough.

The arrangement disclosed offers a system that is sensitive to pressure differentials and rapidly responses to such pressure fluctuations so as to open/close the main liquid discharge through the flow path 38. This is facilitated through the use of a small discharge pilot valve.

The disclosed arrangement can be useful for example to prevent freezing of liquids in a supply line. Accordingly, once the ambient temperature or liquid temperature drops below a predetermined value, the pilot receives a command signal manipulating it into its open position, as a result of which liquid is discharged from the liquid outlet port 26, causing liquid flow through the main line and thus preventing liquid freeze in the liquid line and preventing or reducing the likelihood of damages to the liquid line and equipment articulated thereto.

The system disclosed can be useful also for rinsing a liquid line, e.g. for municipal purposes, wherein a control signal opens the pilot valve (manually or periodically or for example upon sensing of chemical agents in the liquid line) as a result of which the liquid flow path 38 opens so as to discharge liquids from the liquid line.

Figure 4A:
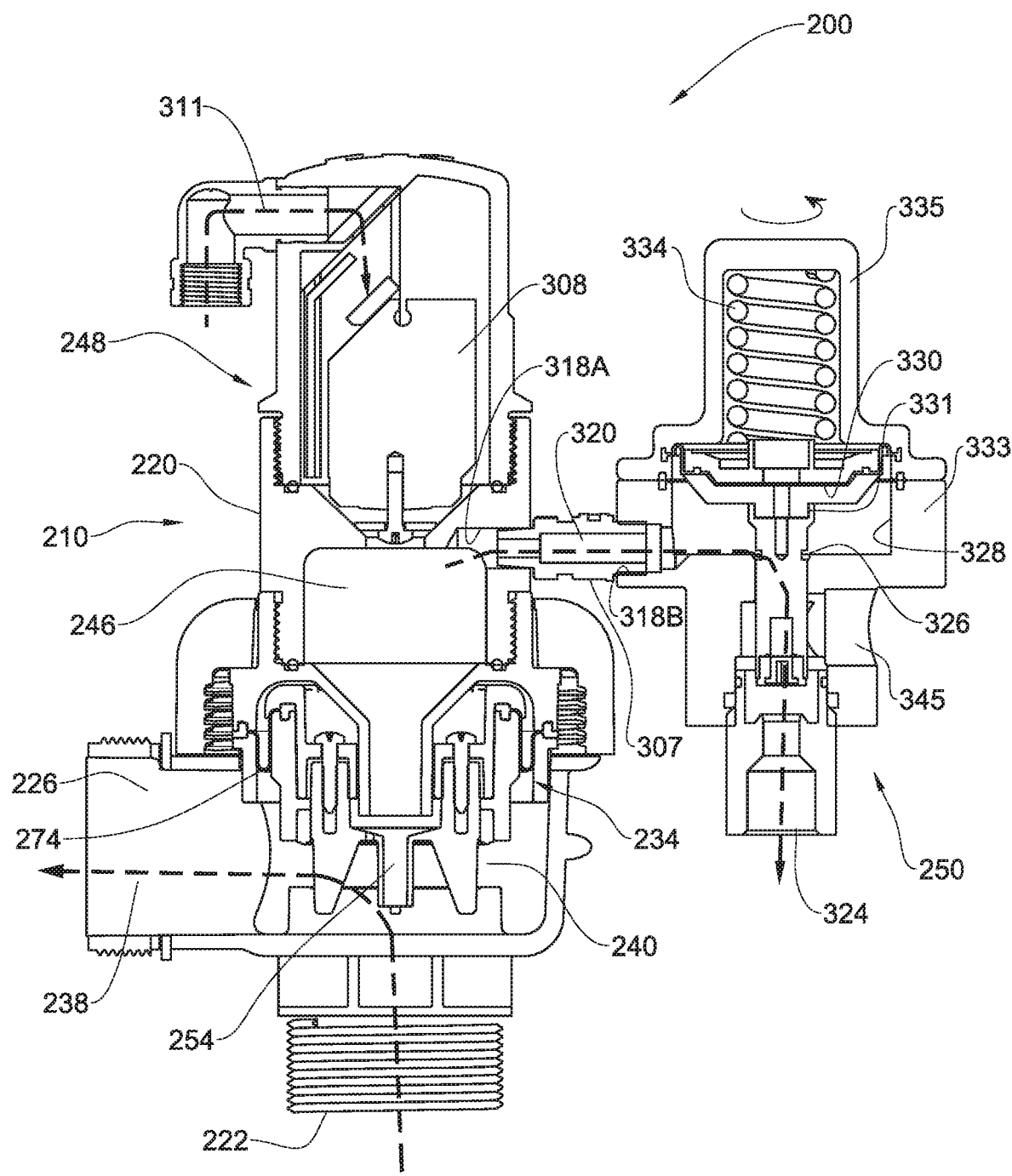
FIGS. 4A and 4B are front views of another example of a liquid discharge valve according to the present disclosure, at an open position and at a closed position, respectively.
Figure 4B:
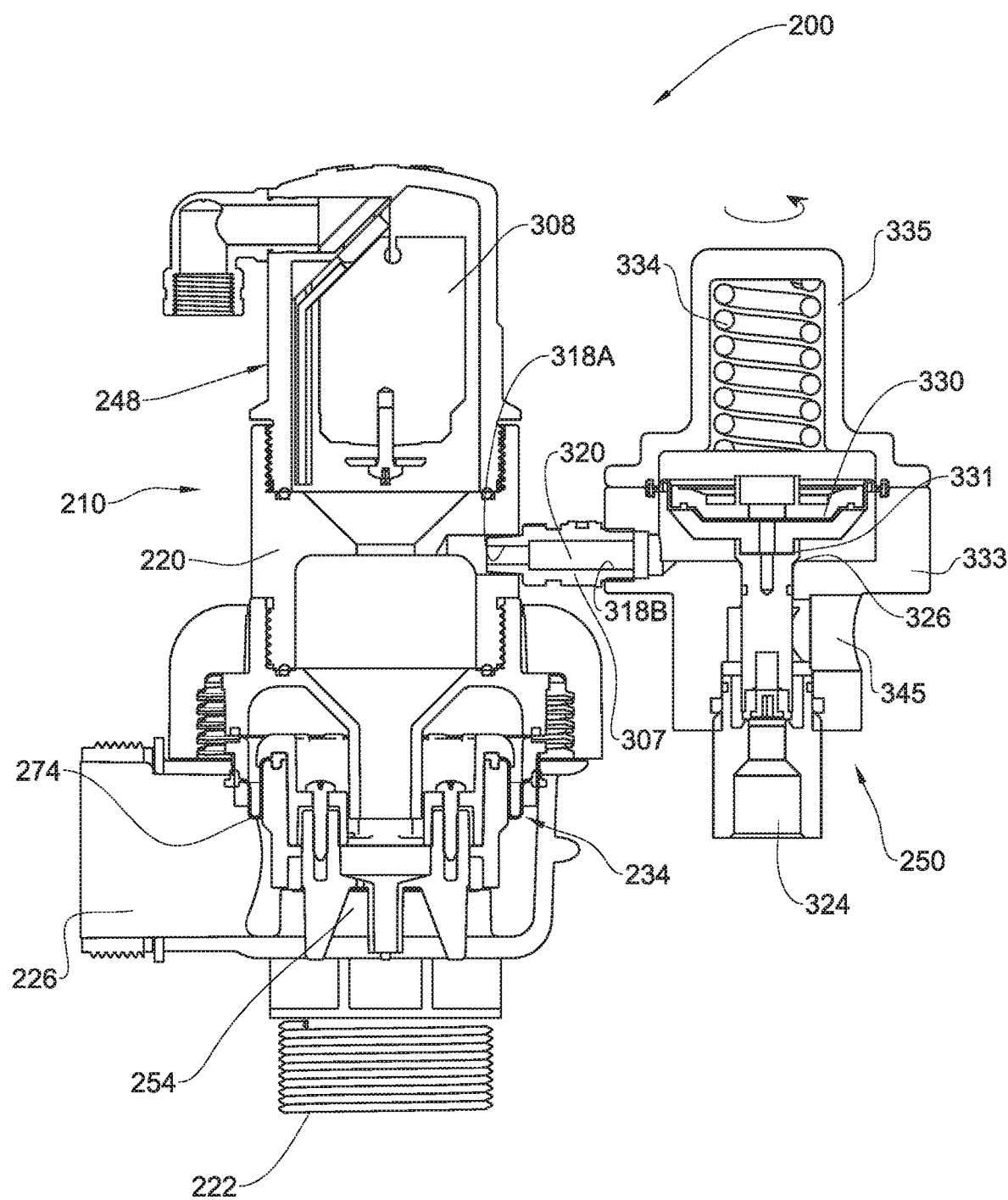

With further reference made now to FIGS. 4A and 4B there is illustrated a modification of a valve assembly according to the disclosure and generally designated 200. The liquid discharge valve assembly 200 comprises elements similar to those disclosed in the previous example and thus like elements are designated with like reference numbers, however shifted by 200.

The liquid discharge valve assembly 200 comprises a liquid discharge valve generally designated 210 which in fact is identical to liquid discharge valve 10 of the of FIGS. 2 and 3 and reference is made back thereto for understanding its structure and operation.

Further noted in FIGS. 4A and 4B the liquid discharge valve 210 is fitted with a substantially vertically extending discharge pilot valve generally designated 250 is articulated with the housing of the liquid discharge valve 210 by a coupler tube 307 extending between port 318A of the housing and port 318B of the pilot valve 250, being n flow communication with the control chamber 246 via an inlet fluid flow path 320.

Similar to the previous example, the section area of the inlet fluid flow path 320 is greater than that of the restricted fluid passage 254 extending between the inlet chamber 240 and the control chamber 246 of the liquid discharge valve 210.

The discharge pilot valve 250 is configured with a discharge port 324 and a sealing shoulder 326 disposed between the inlet port 318B and the discharge port 324. A sealing mechanism 328 is configured with a sealing diaphragm 330 and a sealing portion 331 configured for bearing against the annular sealing shoulder 326 in a sealing fashion (FIG. 4B), with an opposite end of the biasing mechanism 328 being biased by a compression spring 134 disposed within a cap 335 rotatably secured to the housing 333 at a screw coupling fashion, whereby rotating the cap 335 entails corresponding axial displacement thereby resulting in changing the compression force applied by the coiled spring 334 over the sealing diaphragm 330. Similar to the previous example, the discharge pilot valve 250 is a pressure relief valve configured for opening at a predetermined pressure threshold. This pressure threshold is controllable through manual governing the compression force of the coiled spring 334 by rotating the cap 340, thereby tensioning or releasing the spring. However, it is appreciated that governing the compression force of the coiled spring 334 can be facilitated through an electric controller or by hydraulic/pneumatic mechanism, which can also be remote controlled.

The sealing assembly 328 is displaceable between a normally closed position (FIG. 4B) wherein the sealing portion 331 of sealing member 330 sealingly bears against the sealing shoulder 326, and an open position (FIG. 4A) wherein the sealing portion 331 is disengaged from the sealing shoulder 326, so as to relief pressure from the control chamber 246 of the liquid discharge valve 210.

The arrangement and operation of the valve liquid discharge valve 200 assembly disclosed herein is similar to that described hereinabove in connection with the previous example, i.e. at the normal state the valve is at its closed position as disclosed in FIG. 4B, wherein the liquid flow path 338 between inlet port 222 and liquid outlet port 226 is closed, the gas operated valve 248 is closed and the discharge pilot valve 250 is closed too. At this position the pressure at the inlet chamber 240 is substantially similar to the pressure at the control chamber 246 owing to the restricted fluid passage 254 extending between these two chambers, whereby a surface area difference about faces of a membrane 274 it is biased into the closed position and likewise, liquid within the control chamber 246 entails displacement of the float member 308 of the gas operated valve 248 into the closed position.

Once the discharge pilot valve 250 is displaced into the open position (FIG. 4A) owing to a control signal or pressure differential, etc., the flow path 320 between the inlet port 318B and the discharge port 324 opens, resulting in liquid discharge from the control chamber 246 and respective pressure drop therein. As a result of the pressure drop at the control chamber the pressure equilibrium over the membrane 274 and the closing mechanism 234 is disturbed, entailing displacement of the closing mechanism 234 into its open position (FIG. 4A), opening the flow path 238 so that liquid can flow from the liquid line 24 (FIG. 1). Once the flow path 238 is opened it facilitates liquid discharge at high flow rate.

Also as a result of pressure drop at the control chamber 246, the float 308 of the gas operated valve 248 displaces into the open position (FIG. 4A), facilitating fluid intake therethrough (dashed arrow 311 representing an intake fluid flow path).

As can further be seen in FIGS. 4A and 4B, the discharge pilot valve 250 is configured with an additional port 345 extending at a control chamber thereof in flow communication with the discharge port 324. Said additional port 345 can, for example, be fitted with a needle-type valve (not shown) for controlling pressure and eliminating or substantially reducing hammering during displacement of a sealing diaphragm thereof. Alternatively, the additional port can be configured for receiving therein a sensing member, or a controller or a dripper, etc, (not shown).

Figure 4C:
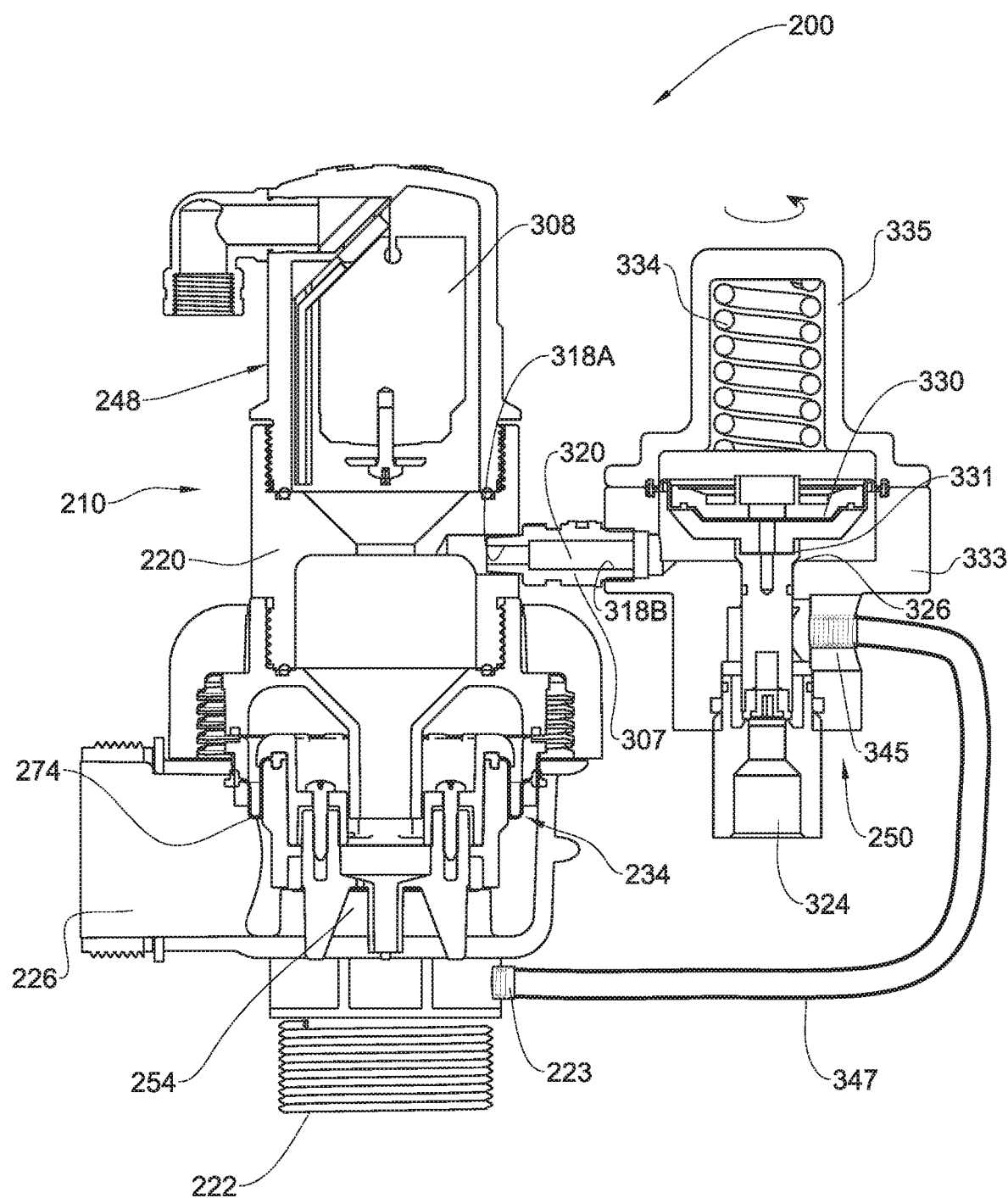
FIG. 4C illustrates a modification of the liquid discharge valve of FIGS. 4A and 4B.

Turning now to FIG. 4C there is illustrated the liquid discharge valve assembly 200 of FIGS. 4A and 4B, wherein the inlet port 222 of the liquid discharge valve 210 has coupling port 223 extending in direct flow communication with the control chamber of the discharge pilot valve 250 through the additional port 345 via a tube 347.

The arrangement is such that the same pressure sensed at the inlet 222 resides now also at the control chamber of the discharge pilot valve 250, rendering the later with improved stability so as to eliminate or substantially reduce hammering of the system and provide stable operation of the discharge pilot valve 250. It is however appreciated that pressure imparted to the discharge pilot valve 250 can be obtained from other pressure sources as well.

The invention claimed is:

1. A liquid discharge valve, comprising:
   a first housing comprising:
      an inlet chamber comprising:
         a liquid inlet port coupleable to a liquid line;
         a liquid outlet port;
         a pressure responsive closing mechanism disposed between said liquid inlet port and said liquid outlet port;
         a liquid flow path between the liquid inlet port and the liquid outlet port; and
      a control chamber being in flow communication with the inlet chamber via a restricted fluid passage, wherein the control chamber has at least one side wall and a top wall;
   a gas operated valve connected to the control chamber, the gas operated valve comprising a fluid inlet within the top wall of the control chamber;
   a first fluid flow path extending from the control chamber up to an interior of the gas operated valve through the fluid inlet of the gas operated valve; and
   a discharge pilot valve configured to discharge liquid from the control chamber, the discharge pilot valve comprising a fluid inlet formed in the at least one side wall of the control chamber, and a fluid outlet, the discharge pilot valve provided in a second fluid flow path in flow communication with the control chamber, wherein a lowermost portion of the fluid inlet of the discharge pilot valve is lower than the fluid inlet of the gas operated valve, thereby configuring the discharge pilot valve to allow the fluid to flow through the fluid outlet at least when level of the fluid is between the fluid inlet of the discharge pilot valve and the fluid inlet of the gas operated valve, and the first fluid flow path is closed at the fluid inlet of the gas operated valve.

2. The liquid discharge valve according to claim 1, wherein the discharge pilot valve further comprises a controller manipulable between an open position and a closed position sealing the second fluid flow path.

3. The liquid discharge valve according to claim 1,
wherein the fluid inlet of the discharge pilot valve comprises a first cross-section area, and
wherein the restricted fluid passage comprises a second cross-section area, the second cross-section area being smaller than the first cross-section area.

4. The liquid discharge valve according to claim 3, wherein the first cross-section area and the second cross-section area are configured to provide a first pressure within the control chamber lower than a second pressure within the inlet chamber, the lower first pressure within the control chamber maintaining displacement of the closing mechanism out of the liquid flow path between the liquid inlet port and the liquid outlet port.

5. The liquid discharge valve according to claim 1, wherein the gas operated valve comprises:
a second housing;
first and second outlet apertures formed in said second housing respectively bounded by first and second valve seatings, said first outlet aperture being of substantially elongated slit like shape, communicating at one end thereof with the second outlet aperture and being substantially less in area than the second outlet aperture;
a flexible closure membrane secured at one end to said second housing and configured to be biased, under fluid pressure in said second housing, against said first and second valve seatings so as to seal said first and second outlet apertures; and
a float member located in said second housing so as to be floatingly displaceable therein between first and second positions respectively adjacent said fluid inlet and said first and second outlet apertures and means for coupling said float member to an opposite end of said membrane,
wherein displacement of said float member from said second to first position progressively detaches successive linear transverse portions of said flexible closure membrane initially from said first valve seating so as to open initially said first outlet aperture and subsequently from said second valve seating so as to open subsequently said second outlet aperture whilst displacement of said float member from said first to said second position allows for said flexible closure membrane to become sealingly biased against said seatings.

6. The liquid discharge valve according to claim 1, wherein the closing mechanism comprises a plunger axially displaceable between an open position at which the liquid flow path is open, and a closed position.

7. The liquid discharge valve according to claim 6, further comprising a sealing mechanism comprising a sealing membrane preventing liquid flow between the inlet chamber and the control chamber.

8. The liquid discharge valve according to claim 1, wherein the discharge pilot valve is configured for override manipulation between a normally closed position, and an open position.

9. The liquid discharge valve according to claim 1, wherein the discharge pilot valve is configured for displacement into its closed position to prevent generation of shock waves through a liquid system accommodating the liquid discharge valve.

10. The liquid discharge valve according to claim 1, wherein a liquid drainage port extends between the control chamber and the inlet chamber, said liquid drainage port configured to facilitate liquid draining from the control chamber.

11. The liquid discharge valve according to claim 1, wherein the gas operated valve comprises a one way valve facilitating fluid flow only in a direction preventing gas flow into the control chamber through a gas outlet of the gas operated valve.

12. The liquid discharge valve according to claim 1, wherein displacement of the gas operated valve into its closed position occurs when pressure at the control chamber is greater than the ambient pressure.

13. The liquid discharge valve according to claim 1, wherein the restricted fluid passage is an opening extending through the closing mechanism and comprises a tubular segment extending therefrom into the inlet chamber, whereby at an event of airing the liquid line, a gas is allowed to enter through the liquid outlet port, and a venturi effect takes place about said tubular segment, resulting in a pressure differential causing a suction effect and under-pressure at the control chamber.

14. The liquid discharge valve according to claim 1, wherein the closing mechanism is normally disposed at its closed position so as to prevent liquid flow from the liquid inlet port to the liquid outlet port, and wherein at an event of pressure decrease within the control chamber, the closing mechanism is displaced into its open position so as to facilitate liquid flow along the liquid flow path between the liquid inlet port and the liquid outlet port.

15. The liquid discharge valve according to claim 1, wherein the discharge pilot valve is configured for opening the second fluid flow path upon buildup of a predetermined pressure differential between ambient pressure and pressure at the control chamber.

* * * * *